US012305933B2

(12) United States Patent
Altman et al.

(10) Patent No.: US 12,305,933 B2
(45) Date of Patent: May 20, 2025

(54) VARIABLE SPEED AIR CONDITIONER FOR ENCLOSURE COOLING

(71) Applicant: Ice Qube, Inc., Greensburg, PA (US)

(72) Inventors: Ridge W Altman, Greensburg, PA (US); Jamshaid Ullah, Shenzhen (CN)

(73) Assignee: Ice Qube, Inc., Greensburg, PA (US)

(*) Notice: Subject to any disclaimer, the term of this patent is extended or adjusted under 35 U.S.C. 154(b) by 306 days.

(21) Appl. No.: 17/395,836

(22) Filed: Aug. 6, 2021

(65) Prior Publication Data

US 2022/0065489 A1 Mar. 3, 2022

Related U.S. Application Data

(60) Provisional application No. 63/108,801, filed on Nov. 2, 2020, provisional application No. 63/062,340, filed on Aug. 6, 2020.

(51) Int. Cl.

| | |
|---|---|
| ***F25B 49/02*** | (2006.01) |
| ***F24F 11/72*** | (2018.01) |
| ***F24F 11/88*** | (2018.01) |
| ***F24F 11/89*** | (2018.01) |
| ***F28F 21/08*** | (2006.01) |
| ***G07F 9/10*** | (2006.01) |

(52) U.S. Cl.

CPC ............ *F28F 21/085* (2013.01); *F24F 11/72* (2018.01); *F24F 11/88* (2018.01); *F24F 11/89* (2018.01); *F25B 49/022* (2013.01); *G07F 9/105* (2013.01); *F25B 2600/111* (2013.01)

(58) Field of Classification Search

CPC ................................ F25B 49/022; F24F 11/88

See application file for complete search history.

(56) References Cited

U.S. PATENT DOCUMENTS

| | | | | |
|---|---|---|---|---|
| 4,027,498 A * | 6/1977 | Fessler | F24F 1/0323 | 62/263 |
| 5,069,041 A * | 12/1991 | Thielman | H05K 7/20609 | 62/97 |
| 5,467,921 A * | 11/1995 | Shreeve | H02H 3/093 | 236/46 R |
| 6,345,511 B1 * | 2/2002 | Esty | F24F 13/32 | 62/298 |
| 6,643,130 B1 * | 11/2003 | DeMarchis | H05K 7/20181 | 361/695 |

(Continued)

OTHER PUBLICATIONS

Seifert, Variable cooling capacity for your cabinet, web page: https://www.seifertsystems.com/en/products/variable-speed-cooling-units/, Apr. 30, 2017 (1 page).

(Continued)

*Primary Examiner* — Mohammad Ali
*Assistant Examiner* — Vincent W Chang
(74) *Attorney, Agent, or Firm* — Gabriel & Co; Andrew M Gabriel

(57) ABSTRACT

One example provides a cooling system, including: a first side configured to face an ambient environment; a second side configured to face an enclosure interior; a flange that surrounds the system and is configured for attachment to an opening of the enclosure; a thermostat; one or more fans; one or more compressors; and a controller configured to: utilize two or more set points and input from the thermostat to variably control the one or more fans and one or more compressors using variable direct current (VDC).

12 Claims, 4 Drawing Sheets

(56) References Cited

U.S. PATENT DOCUMENTS

| | | | | |
|---|---|---|---|---|
| 2006/0179871 | A1* | 8/2006 | Wagner | F24F 1/04 62/426 |
| 2006/0248907 | A1* | 11/2006 | Allen | F25D 29/003 62/239 |
| 2007/0227181 | A1* | 10/2007 | Leon | F24F 1/027 62/428 |
| 2017/0356668 | A1* | 12/2017 | Goel | F24F 11/30 |
| 2019/0053399 | A1* | 2/2019 | Greubel | H05K 7/202 |
| 2022/0330451 | A1* | 10/2022 | Koehler | H05K 7/20136 |

OTHER PUBLICATIONS

Dantherm, DC Air Conditioning, web page: https://www.dantherm.com/gb/to-cool/commercial-industrial-cooling/dc-air-conditioning/, Feb. 19, 2019 (4 pages).

* cited by examiner

VARIABLE SPEED AIR CONDITIONER FOR ENCLOSURE COOLING

CROSS-REFERENCE TO RELATED APPLICATIONS

This application claims priority to U.S. provisional patent application Ser. No. 63/062,340, filed on Aug. 6, 2020, and 63/108,801, filed on Nov. 20, 2020, each having the same title as the instant application; the contents of each prior application are incorporated by reference herein.

FIELD

The subject matter disclosed herein relates to enclosure cooling systems and related techniques. Some of the subject matter disclosed herein relates to a cooling system that is mounted to the side of an enclosure and used for cooling items within the enclosure, such as heat generating components in the telecommunications industry.

BACKGROUND

Industry and manufacturing have emerged with the widespread use of enclosures for a variety of items, for example electronics or other items that require protection from the elements as well as cooling. To protect these items from harsh environments, they are typically placed in sealed enclosures or workstations that permit efficient operation without the threat of being exposed to exterior contaminates including dust, residue, rain and liquids that have the potential to cause serious damage. Since the items (such as electronics used in the telecommunications industry or like equipment) often generate heat within the enclosure, various cooling equipment such as air conditioners, heat exchangers, in-line compressed air coolers and filtered fan systems are used to maintain required operating temperatures within the enclosure. In some cases, such cooling equipment may be provided as an addition to the enclosure, e.g., a cooling system may be provided separately and attached to an enclosure.

BRIEF SUMMARY

In summary, one embodiment provides a cooling system, comprising: a first side configured to face an ambient environment; a second side configured to face an enclosure interior; a flange that surrounds the system and is configured for attachment to an opening of the enclosure; a thermostat; one or more fans; one or more compressors; and a controller configured to: utilize two or more set points and input from the thermostat to variably control the one or more fans and one or more compressors using variable direct current (VDC).

Another embodiment provides a method, comprising: receiving input indicating two or more set points; receiving data from a thermostat; and operating a controller that uses the two or more set points and data from the thermostat to variably control one or more fans and one or more compressors using variable direct current (VDC).

A further embodiment provides a system, comprising: an enclosure; and a cooling system comprising: a first side configured to face an ambient environment; a second side configured to face an enclosure interior; a flange that surrounds the system and is configured for attachment to an opening of the enclosure; a thermostat; one or more fans; one or more compressors; and a controller configured to:

utilize two or more set points and input from the thermostat to variably control the one or more fans and one or more compressors using variable direct current (VDC).

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
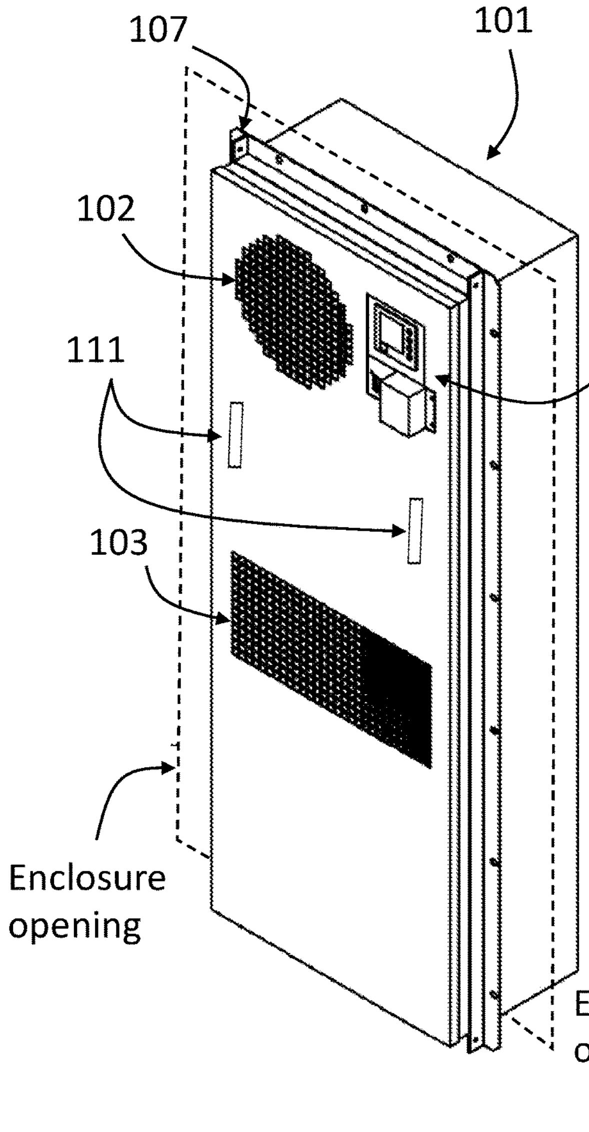
FIG. 1 and FIG. 2 illustrate example views of an example air conditioner.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "in an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, etc. In other instances, well-known structures, materials, or operations are not shown or described in detail to avoid obfuscation.

An embodiment provides an air conditioner that runs on direct current, e.g., 48vdc, that operates at variable speeds to provide closed-loop cooling. An embodiment may take the form of an inset mounted air conditioner for enclosure cooling.

Variable speed is achieved through a driver that is controlled by a controller with milliamp outputs to the driver that in turn varies the speed of a component such as a fan or a compressor. A digital controller or control pad may be provided for manual adjustments or other inputs.

An embodiment employs high and low set points for variable speed control, e.g., according to a control program executed by the controller. In an embodiment, both the high and low set points are adjustable. Adjusting the low setpoint or the high set point will affect the speed of the compressor and fan(s), as well as how fast the air conditioner ramps up to full speed.

In an embodiment, components such as one or more of a compressor and fan(s) are powered on and the speed of the compressor or fan(s), or both, is adjusted based on the set point(s) and the current temperature within the enclosure. For example, in an embodiment, ambient side fan(s) vary speed off the low set point and high setpoint to coincide with the compressor and reject heat at variable rates. Enclosure side fan(s) vary speed from the high set point and off setpoint, e.g., which have a seven-degree differential. As the temperature hits the high setpoint, evaporator fan(s) run at full speed and as the low setpoint is approached speed ramps down, allowing for less energy consumption, less noise (fewer decibels), and less heat absorption. When the temperature starts to rise above the off setpoint (e.g., seven degrees below the high setpoint), fan(s) begin to increase speed as the temperature gets closer to the high setpoint. Once the air temperature in the enclosure reaches the high setpoint, the air conditioner is running at full speed. Once temperature in the enclosure goes above the low setpoint, the unit will cycle on.

In an embodiment, the enclosure to be cooled is a cellular cabinet or enclosure, for example a 5G telecommunications enclosure. A cellular communications enclosure or cabinet may be located for example in a cellular tower or at or near the top of a building.

In an embodiment, a simple network management protocol (SNMP) module may be included, e.g., within circuitry provided with an embodiment, for supporting an Ethernet connection via an Ethernet port. An SNMP module supports a protocol that is common to other cellular cabinet components and network devices, permitting a common communication channel to be utilized for controlling the cooling equipment and other equipment in the cellular cabinet.

In an embodiment, software drives a compressor and allows for automated protocols controlling the system components. In an embodiment, as the system ramps up, the fan speed is advanced as compared to that of the compressor, i.e., the fan is adjusted to increase its speed more than the compressor speed. In an embodiment, when ramping down, the fan speed operates in the opposite manner with respect to the compressor speed.

An embodiment may operate according to one or more automated protocols, which may be adjusted. By way of example, if a set point is at 80° F., a high set point is at 100° F., with the temperature climbing slowly (e.g., less than a degree per minute), a 20 degree temperature range between set points is the time/temperature spread for increasing components such as fan(s) to max speed. In this example, the fan uses the 20-degree spread to ramp the system up as the temperature fluctuates within this temperature range.

In an embodiment, sudden temperature change may be handled differently by controlling software as compared to gradual temperature changes. For example, with a sudden temperature rise, e.g., 5 degrees in under a minute, the fan(s) automatically ramp up more quickly, e.g., to maximum, than would otherwise be the case if the fan(s) were following a slow temperature change protocol. Even in the face of sudden temperature changes, a control protocol may be dynamically adjusted, e.g., based on thermostat feedback, which may be included in or in communication with a digital controller 104. For example, if the fan(s) compensate for the sudden temperature change by slowing the rate of temperature increase, halting temperature increase, or reversing temperature increase, then the fan(s) can slow down to a normal glide path, e.g., along a predetermined or default rate of speed change using a different protocol.

In an embodiment, a mechanical overload compressor is combined with an electronic overload protection device. For example, temperature or current overload of the compressor may trip a mechanical overload protection device, where an electronic overload protection device monitors for over current. An embodiment controls the current by watching for over-current or another anomaly. This provides a redundant system of protection.

Adjusting the setpoints to be further away from one another will increase the efficiency of the air conditioner because this allows the compressor and the ambient side fan(s) to modulate to find a balance point in the cooling required and allows for the air conditioner to use less electricity (if a higher capacity is not needed).

In an embodiment, a remote control (e.g., via ethernet data communication) enables control of the speeds and any function of the unit from anywhere in the world through several protocols.

In an embodiment, a touch screen controller, e.g., an LCD touch sensitive smart controller, is provided as a digital controller in a control panel.

An embodiment includes a built in or programmable minimum off cycle to prevent short cycling.

An embodiment includes a high efficiency, variable speed compressor.

In an embodiment, a binary mount allows for the unit to be mounted as an inset vertical mount, partially recessed into the application, or vertical mount, where the mounting surface of the unit is flush to the surface of the application. In an embodiment, the binary mount utilizes removable and adjustable flanges for the inset vertical mount and removable threaded studs for the vertical mount. This increases the versatility of the unit and makes it easy for customers to opt for the inset vertical mount and vertical mount configurations.

The description now turns to the figures, which illustrate certain example embodiments. The dimensions and other numerical information provided herein, including in the figures, are provided only by way of example and are not limiting. In the figures, certain example dimensions are provided in inches and [millimeters].

Figure 2:
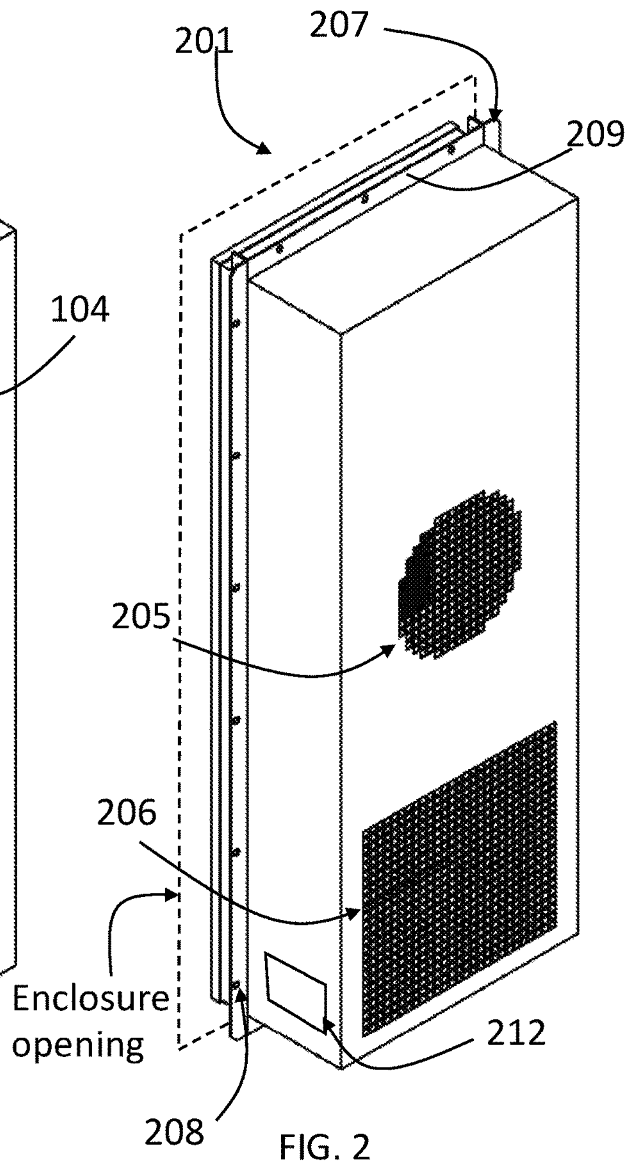

FIG. 1-2 illustrate perspective views of an enclosure side and an ambient side, respectively, of an example air conditioner 101/201 that is configured to be mounted on an enclosure (indicated by the dashed line in FIG. 1-2). As shown in FIG. 1-2, the air conditioner includes a mounting flange 107/207 around its exterior, permitting it to be mounted to the side of an enclosure, such as a telecommunications enclosure that houses heat generating electronics, in a sealed fashion. In one example, a material 209 such as a rubber strip, coating or other sealing material may be supplied to the flange 107/207, e.g., such as applying a rubber strip as material 209 to adhere to the ambient side of the flange 207.

FIG. 1 illustrates an enclosure side view of an example air conditioner 101. In FIG. 1 the enclosure air inlet 102, the enclosure air return or exhaust 103, as well as the digital controller (control panel) 104 are illustrated. In the view of FIG. 1, the digital controller 104 is illustrated in combination with a power and data communication unit, which includes a power interface. The power interface collectively indicated at 104 with digital controller may take the form of a power and data interface to facilitate wired or wireless communications. The control panel 104 may communicate with internal cooling system components or devices as well as external devices, e.g., a technician laptop computer, via wired or wireless communication mechanisms, or a combination thereof.

FIG. 2 illustrates an ambient side view of an example air conditioner 201. In FIG. 2, the ambient air return or exhaust is illustrated at 205, as is the ambient air intake 206. One or more fans (not illustrated in FIG. 2) may be included in the ambient side of the air conditioner 201, e.g., to circulate ambient air. In an embodiment, the ambient air side of the example air conditioner 201 is sealed or separated from the enclosure side of the air conditioner, i.e., to facilitate closed loop cooling.

As may be appreciated from FIG. 1 and FIG. 2, the air conditioner 101/201 may be attached or mounted to an enclosure, e.g., a 5G telecommunications cabinet. The air conditioner 101/201 may be attached to an enclosure via flange 107/207, for example using an attachment such as removable threaded studs placed through holes in the flange 107/207, one of which is indicated at 208.

In one embodiment, a binary mount is provided. In such an embodiment, a binary mount allows for the unit 101/201 to be mounted as an inset vertical mount on an enclosure, partially recessed into the application or enclosure, or vertical mount, where the mounting surface of the unit is flush to the surface of the application or enclosure. In an embodiment, the binary mount utilizes removable and adjustable flanges 107/207 for the inset vertical mount and removable threaded studs for the vertical mount, which may be placed into holes 208 of the flange. This increases the versatility of the unit and makes it easy for customers to opt for the inset vertical mount and vertical mount configurations.

In an example, an inset vertical mounting flange 107/207 of the unit 101/201 permits an inset vertical mounting to be accomplished, where for example the unit 101/201 is partially recessed into the application (e.g., enclosure). A flange 107/207 with holes 208 for accepting removable studs permits for also choosing a vertical mounting configuration. This permits the unit 101/201 to be mounted in a flush or substantially flush configuration with respect to the application (e.g., enclosure).

In an example, one or more removable mounting brackets 111 may be provided to one or more sides of a housing of the unit. In the example of FIG. 1, the removable brackets, which may be fixed to the housing using screws, rivets, etc., provide for increased ease of installing the unit 101 with brackets 111 rather than another mechanism, e.g., welded studs. If one of the removable brackets 111 bends, it can be easily removed and replaced in the field. Having the brackets 111 be removeable allows the customer flexibility in not having them protrude into the enclosure. In another example, the brackets 111 are not removable, e.g., are formed integrally with the housing.

Referring again to FIG. 2, an embodiment may include one or more vents for venting air directionally. In the example illustrated in FIG. 2, a diverter plate 212 is provided covering an additional vent on the side of the unit 201. As may be appreciated, the unit 201 may have more than one vent and/or diverter plate, e.g., one on each side, such that the airflow may be directed by appropriately placement of a diverter plate 212. In one example, the diverter plate 212 clips or screws into place, allowing for secure placement and easy removal. Further, the diverter plate 212 may remain fixed in place with respect to the housing, e.g., attached at one end via a screw, and moved into different positions with respect to the vent, e.g., moved into a blocking position or a position allowing air to pass through an underlying vent.

Figure 3:
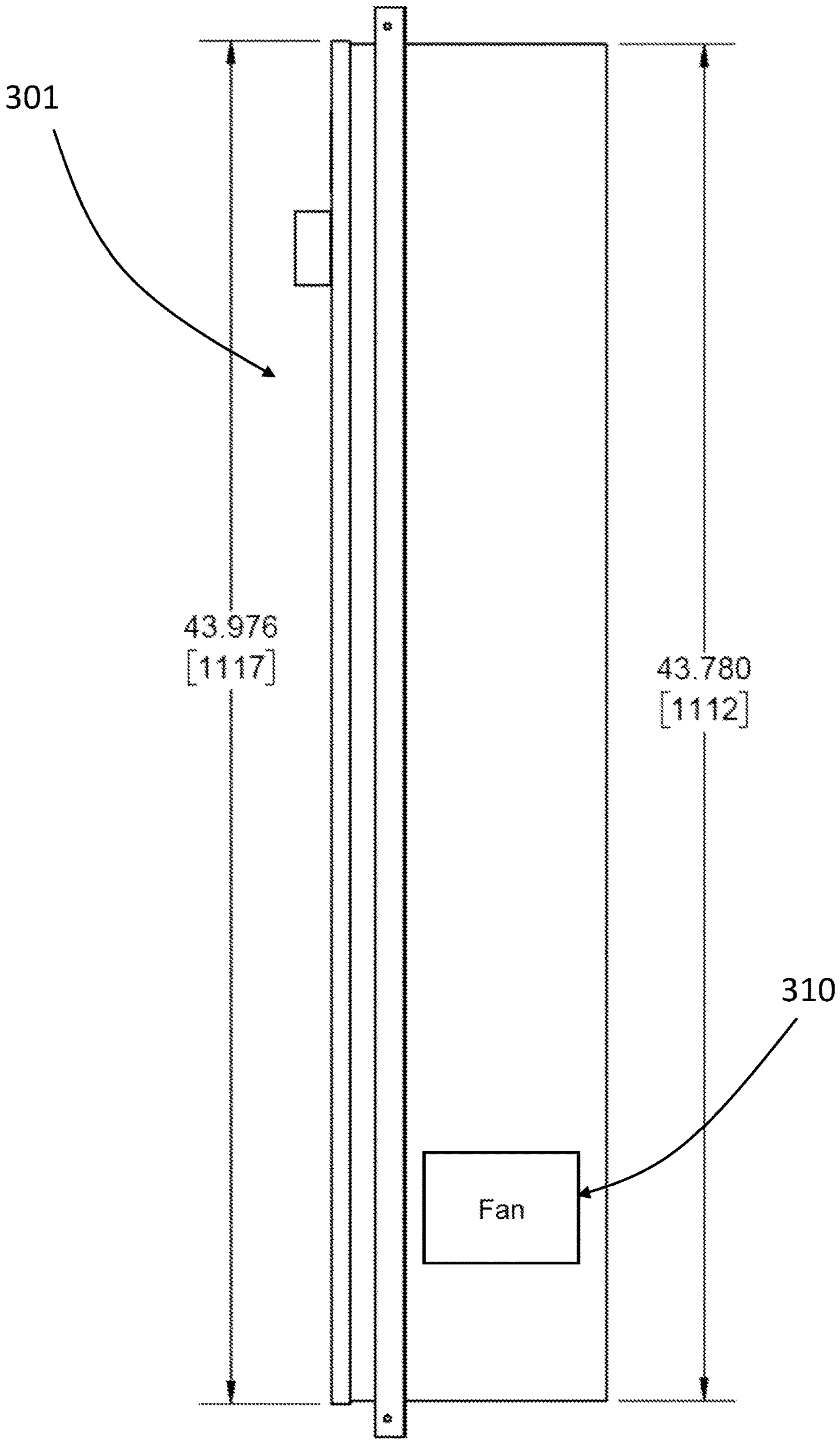
FIG. 3 illustrates a side view of an example air conditioner.

FIG. 3 illustrates a side view of an example air conditioner 301. In FIG. 3, an example of one or more fans 310 included in the air conditioner 401 is illustrated. As may be appreciated, the one or more fans 310 may be included in an ambient side compartment, an enclosure side compartment, or both, of the air conditioner 301.

Figure 4:
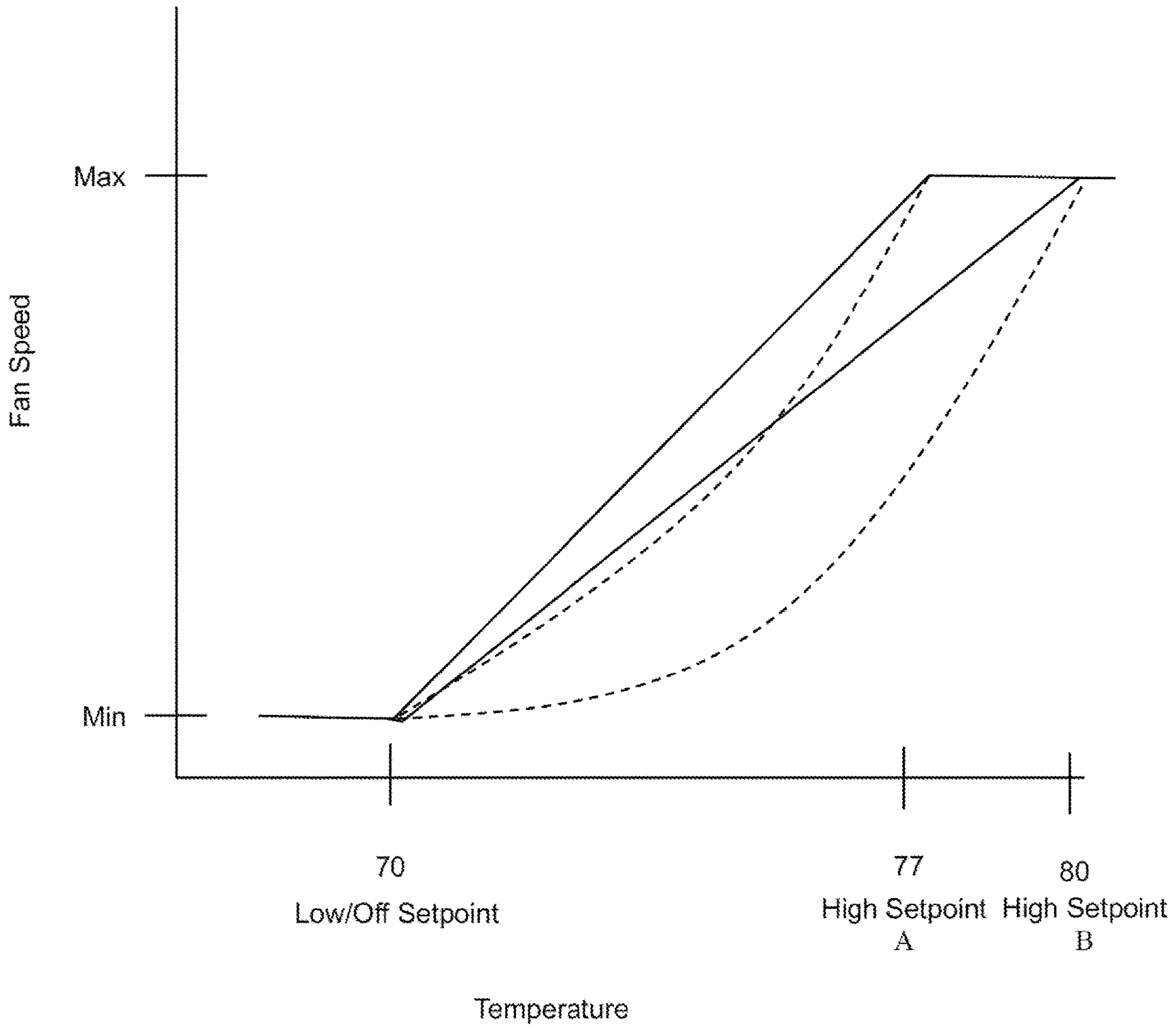
FIG. 4 illustrates an example operating method of an example air conditioner.

As shown in the example of FIG. 4, an embodiment provides a variable speed, closed-loop, adjustable, inset mounted air conditioner for enclosure cooling using various set points and cooling protocols. Variable speed of the fan(s) and/or the compressor is achieved through driver(s) or motor(s) that is/are controlled by a controller, e.g., with milliamp outputs to the driver that in turn vary the speed of a component such as the fan(s) and/or the compressor.

As shown in FIG. 4, which utilizes fan speed as an example, high and low (or off) set points (of enclosure side temperature) for control of variable speed may be present and/or adjusted. In the example of FIG. 4, a low set point is set at 70° F. and high set points A and B are at 77° F. or 80° F., respectively. While the example of FIG. 4 uses an adjusted high set point, in an embodiment all set points are adjustable. Further, the set point temperatures for the ambient side components and the enclosure side components, e.g., fans, may be differentially set, e.g., high and low set point(s) for ambient side and high and low set point(s) for enclosure side.

In the example of FIG. 4, two solid lines are used to represent fan and/or compressor speeds of two example high set points. These illustrate linear changes in speed. However, the change may not be linear for either or both cases, which is illustrated by the dashed lines in FIG. 4. The nature or amount of speed change for a component may be programmed. The programmed speech change and its character, e.g., linear, non-linear, may be adjusted.

As shown in FIG. 4, adjusting the setpoint(s) will affect the speed of the compressor and/or fan(s) and how fast the air conditioner ramps up to full speed. By way of example, ambient side fan(s) vary speed off one or more of the low set point and high setpoint to coincide with the compressor and reject heat at variable rates. Enclosure side fan(s) vary speed from high set point and off setpoint, which in the example of FIG. 4 is a seven-degree differential (70° F.-77° F.).

By way of example, as the temperature increases and hits the high setpoint (77° F.), the evaporator fan is running at full speed. As the temperature reduces and approaches the low 70° F. setpoint, the evaporator fan slows down, allowing for less energy consumption, reduced noise (fewer decibels), and less heat. When the temperature starts to rise above the low setpoint (70° F., seven degrees below setpoint), fan(s) begin to increase speed as the temperature gets closer to the high setpoint (77° F.). Once the temperature reaches the high setpoint (70° F.), the fan(s) is/are running at full speed.

Once temperature goes above the low setpoint (70° F.), the air conditioner will cycle on. If the low setpoint is at 70° F. and the high setpoint is at 80° F., as temperature increases above low setpoint (70° F.), the ambient side fan(s) and compressor will start to ramp up in speed. As temperature rises toward the high setpoint (80° F.) the evaporator fan(s) speed reaches max speed. At the low setpoint (70° F.), the compressor and ambient side fan(s) will cycle on at the lowest speed. As temperature increases above the low setpoint (70° F.) the compressor and ambient side fan(s) will increase speed to try and compensate for increased heat load. Ambient side fan(s) and compressor will continue to increase speed until temperature reaches high setpoint (e.g., 77° F. or 80° F., depending on the high set point chosen).

Adjusting the high setpoint to be further away from the low setpoint will increase the efficiency of the air conditioner. That is, this allows the compressor and the ambient side fan(s) to modulate to find a balance point in the cooling required and allows for the air conditioner to use less electricity if a higher capacity is not needed.

In an embodiment, a voltage divider is included after the input voltage, which separates the line voltage from the controller voltage (to the control panel 104). The controller 104 has a communication port, e.g., an ethernet port, to be able to control the air conditioner from anywhere in the world via the Internet. The communication port has a potential for a shock hazard and uses a voltage divider to eliminate the hazard. In some examples, the voltage divider has multiple insulation layers or techniques applied, e.g., is double insulated and installed between the input voltage and the (low) voltage controller circuit. In one example circuitry utilized, 48VDC input is used, with 12 VDC output, capable of handling 500 milliamps.

Figure 5:
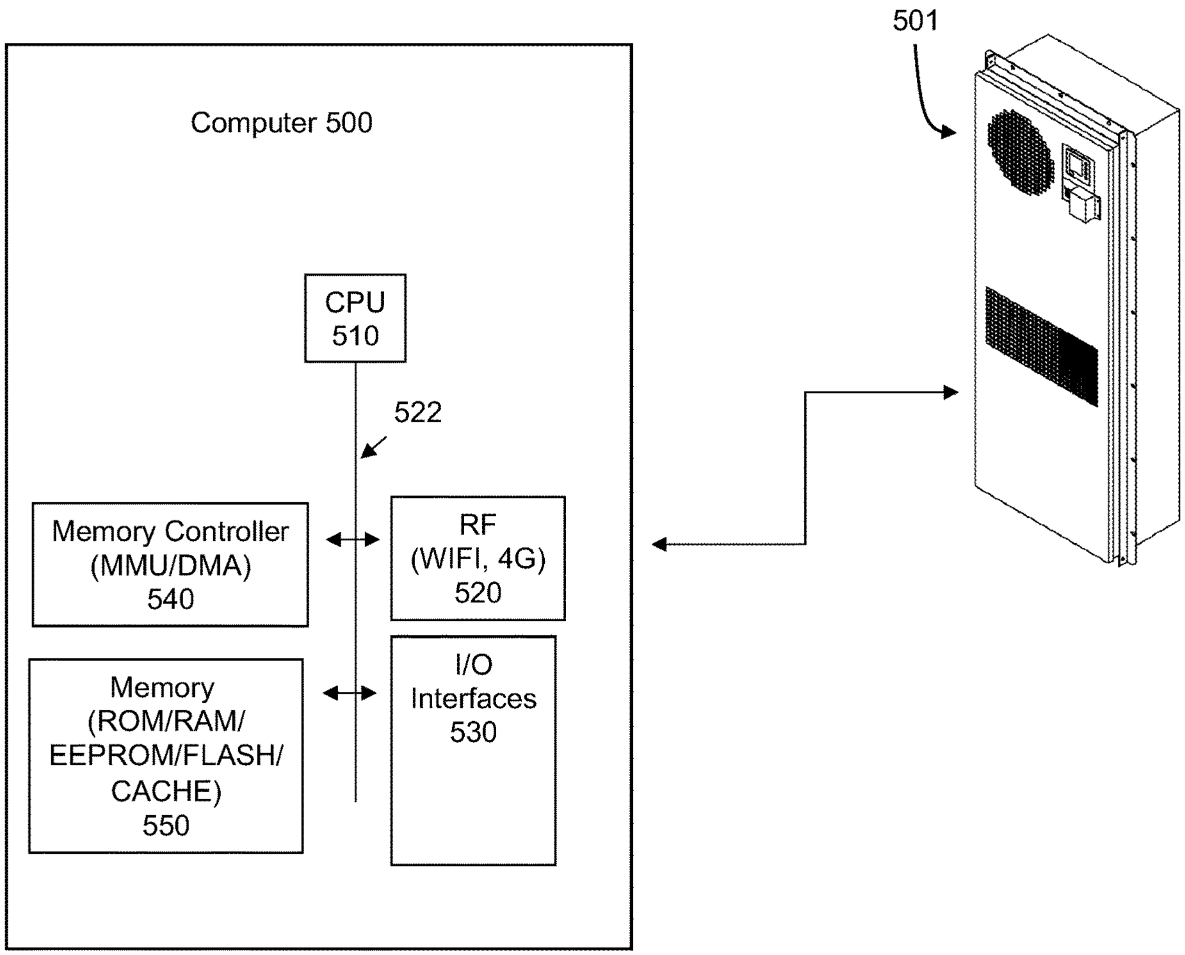
FIG. 5 illustrates an example system.

Remote (e.g., ethernet) communication is able to control the speeds and any function of the unit 101/201 from anywhere in the world through several protocols. It therefore will be readily understood that certain embodiments can be implemented using any of a wide variety of devices or combinations of devices. Referring to FIG. 5, an example device that may be used in implementing one or more embodiments includes a controller in the form of a computing device (computer) 500, for example included in an embodiment, component thereof such as a control panel 104, and/or another system (e.g., a tablet, laptop or desktop computer).

The computer 500 may execute program instructions or code configured to store and process data and perform other functionality of the embodiments. Components of computer 500 may include, but are not limited to, a processing unit 510, which may take a variety of forms such as a central processing unit (CPU), a graphics processing unit (GPU), a programmable circuit or other programmable hardware, a combination of the foregoing, etc., a system memory controller 540 and memory 550, and a system bus 522 that couples various system components including the system memory 550 to the processing unit 510. It is noted that in certain implementations, computer 500 may take a reduced or simplified form, such as a micro-control unit implemented in a control panel of an air conditioner, where certain of the components of computer 500 are omitted or combined.

The computer 500 may include or have access to a variety of non-transitory computer readable media. The system memory 550 may include non-transitory computer readable storage media in the form of volatile and/or nonvolatile memory devices such as read only memory (ROM) and/or random-access memory (RAM). By way of example, and not limitation, system memory 550 may also include an operating system, application programs, other program modules, and program data. For example, system memory 550 may include application programs such as variable speed control software and/or air conditioner operational software for implementing various cooling protocols, as described herein. Data may be transmitted by wired or wireless communication, e.g., to or from first device to another device, e.g., communication between a remote device or system such as computer 500 and air conditioner 501, which itself may include a device like the computer 500, in one example in a reduced form, such as in the form of a control panel with dedicated circuitry or a microcontroller.

A user can interface with (for example, enter commands and information) the computer 500 through input devices such as a touch screen, keypad, etc. A monitor or other type of display screen or device may also be connected to the system bus 522 via an interface, such as an interface 530. The computer 500 may operate in a networked or distributed environment using logical connections to one or more other remote computers or databases. The logical connections may include a network, such local area network (LAN) or a wide area network (WAN) but may also include other networks/buses.

It should be noted that various functions described herein may be implemented using processor executable instructions stored on a non-transitory storage medium or device. A non-transitory storage device may be, for example, an electronic, electromagnetic, or semiconductor system, apparatus, or device, or any suitable combination of the foregoing. More specific examples of a non-transitory storage medium include the following: a portable computer diskette, a hard disk, a random-access memory (RAM), a read-only memory (ROM), an erasable programmable read-only memory (EPROM or Flash memory), a portable compact disc read-only memory (CD-ROM), a solid-state drive, or any suitable combination of the foregoing. In the context of this document "non-transitory" media includes all media except non-statutory signal media.

Program code embodied on a non-transitory storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN) or the connection may be made through other devices (for example, through the Internet using an Internet Service Provider), through wireless connections, or through a hard wire connection, such as over a USB or another power and data connection.

Example embodiments are described herein with reference to the figures, which illustrate various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific elements are illustrated in the figures, and a particular ordering or organization of elements or steps has been illustrated, these are non-limiting examples. In certain contexts, two or more elements or steps may be combined into an equivalent element or step, an element or step may be split into two or more equivalent elements or steps, or certain elements or steps may be re-ordered or re-organized or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected by one skilled in the art without departing from the scope or spirit of the disclosure.

What is claimed is:

1. A cooling system, comprising:

a first side configured to face an ambient environment;

a second side configured to face an enclosure interior;

a flange that surrounds the system and is configured for attachment to an opening of the enclosure;

a thermostat;

one or more fans;

one or more compressors; and a controller panel comprising a digital controller, a user interface, and a voltage divider; the digital controller being configured to:

utilize two or more set points and input from the thermostat to variably control one or more of the one or more fans and one or more compressors using a constant input of 48 volts that is converted to differing amounts of variable direct current (VDC) outputs;

the voltage divider being configured to separate a line voltage from the user interface of the controller panel, lowering the line voltage provided to the user interface.

2. The cooling system of claim 1, wherein the two or more set points comprise three or more set points.

3. The cooling system of claim 1, wherein the digital controller is configured to differentially control the one or more fans as compared to the one or more compressors utilizing the two or more set points.

4. The cooling system of claim 3, wherein the digital controller is configured to operate the one or more fans at a different rate as compared to the one or more compressors based on the two or more set points.

5. The cooling system of claim 4, wherein the digital controller is configured to differentially control the one or more fans and the one or more compressors utilizing the two or more set points according to a predetermined protocol.

6. The cooling system of claim 5, wherein the predetermined protocol is selected via user input.

7. The cooling system of claim 6, wherein the user input is remote user input.

8. The cooling system of claim 1, wherein the flange comprises a binary mount.

9. The cooling system of claim 8, wherein the binary mount comprises a series of holes configured to receive threaded studs for attachment to the enclosure.

10. The cooling system of claim 8, comprising a sealing material collocated with at least one side of the flange.

11. The cooling system of claim 1, wherein the constant input of 48 volts is reduced, at least in part, via the voltage divider.

12. A system, comprising:

an enclosure; and a cooling system comprising:

a first side configured to face an ambient environment;

a second side configured to face an interior of the enclosure;

a flange that surrounds the system and is configured for attachment to an opening of the enclosure;

a thermostat;

one or more fans;

one or more compressors; and a controller panel comprising a digital controller, a user interface, and a voltage divider;

the digital controller being configured to:

utilize two or more set points and input from the thermostat to variably control one or more of the one or more fans and one or more compressors using a constant input of 48 volts that is converted to differing amounts of variable direct current (VDC) outputs;

the voltage divider being configured to separate a line voltage from the user interface of the controller panel, lowering the line voltage provided to the user interface.

* * * * *